(12) United States Patent
TenEyck

(10) Patent No.: US 6,231,818 B1
(45) Date of Patent: May 15, 2001

(54) AMORPHOUS NON-INTUMESCENT INORGANIC FIBER MAT FOR LOW TEMPERATURE EXHAUST GAS TREATMENT DEVICES

(75) Inventor: John D. TenEyck, Lewiston, NY (US)

(73) Assignee: Unifrax Corporation, Niagara Falls, NY (US)

( * ) Notice: Subject to any disclaimer, the term of this patent is extended or adjusted under 35 U.S.C. 154(b) by 0 days.

(21) Appl. No.: 09/456,937

(22) Filed: Dec. 7, 1999

Related U.S. Application Data

(60) Provisional application No. 60/111,353, filed on Dec. 8, 1998.

(51) Int. Cl.[7] .......................... B01D 53/94; B01D 53/34; F01N 3/28
(52) U.S. Cl. .......................... 422/179; 422/177; 422/221; 428/920
(58) Field of Search .................................. 422/179, 180, 422/221, 177; 428/920–921

(56) References Cited

U.S. PATENT DOCUMENTS

| | | |
|---|---|---|
| 4,279,864 | 7/1981 | Nara et al. . |
| 4,929,429 | 5/1990 | Merry . |
| 5,028,397 | 7/1991 | Merry . |
| 5,132,061 * | 7/1992 | Lindeman et al. ................... 264/45.3 |
| 5,250,269 | 10/1993 | Langer . |
| 5,290,522 | 3/1994 | Rogers et al. . |
| 5,389,716 * | 2/1995 | Graves ................................ 524/510 |
| 5,580,532 | 12/1996 | Robinson et al. . |
| 5,585,312 * | 12/1996 | TenEyck et al. ....................... 501/35 |

FOREIGN PATENT DOCUMENTS

| | | |
|---|---|---|
| 765993 A1 | 4/1997 | (EP) . |
| 803643 A1 | 10/1997 | (EP) . |
| 1481133 | 7/1977 | (GB) . |

* cited by examiner

Primary Examiner—Hien Tran
(74) Attorney, Agent, or Firm—Renner, Kenner, Greive, Bobak, Taylor & Weber

(57) ABSTRACT

A non-intumescent mat for providing a support structure for low temperature fragile structures in exhaust gas treatment devices, such as catalytic converters, diesel particulate traps, and like, comprising amorphous inorganic fibers. The fibers have Young's Modulus of less than about $20 \times 10^6$ psi and a geometric mean diameter less than about 5 $\mu$m. The mat is adapted to provide a holding force of at least 15 psi throughout an average mat temperature range from ambient temperature up to at least about 350° C. The amorphous inorganic fibers are preferably melt formed fibers comprising the fiberization product of a melt comprising alumina/silica.

36 Claims, 4 Drawing Sheets

AMORPHOUS NON-INTUMESCENT INORGANIC FIBER MAT FOR LOW TEMPERATURE EXHAUST GAS TREATMENT DEVICES

CROSS REFERENCE TO RELATED APPLICATIONS

This application claims priority from Provisional Patent Application No. 60/111,353, filed on Dec. 8, 1998.

FIELD OF THE INVENTION

The present invention is directed to a mat functioning as a support element for fragile structures in exhaust gas treatment devices, such as catalytic converters, diesel particulate traps, and the like, for the treatment of exhaust gases. More particularly, the present invention is directed to an amorphous, non-intumescent inorganic fiber mat as a support element for low temperature exhaust gas treatment devices.

BACKGROUND OF THE INVENTION

Catalytic converter assemblies for treating exhaust gases of automotive and diesel engines contain a fragile structure, such as a catalyst support structure, for holding the catalyst, used to effect the oxidation of carbon monoxide and hydrocarbons and the reduction of oxides of nitrogen, the fragile structure being mounted within a metal housing. The fragile structure is preferably made of a frangible material, such as a monolithic structure formed of metal or a brittle, fireproof ceramic material such as aluminum oxide, silicon dioxide, magnesium oxide, zirconia, cordierite, silicon carbide and the like. These materials provide a skeleton type of structure with a plurality of tiny flow channels. However, as noted hereinabove, these structures can be, and oftentimes are, very fragile. In fact, these monolithic structures can be so fragile that small shock loads or stresses are often sufficient to crack or crush them.

The fragile structure is contained within a metal housing, with a space or gap between the external surface of the fragile structure and the internal surface of the housing. In order to protect the fragile structure from thermal and mechanical shock and other stresses noted above, as well as to provide thermal insulation, it is known to position at least one ply or layer of mounting or support material within the gap between the fragile structure and the housing. For example, assignee's U.S. Pat. Nos. 4,863,700, 4,999,168, 5,032,441, and 5,580,532, the disclosure of each of which is incorporated herein by reference, disclose catalytic converter devices having a mounting or support material disposed within the gap between the housing and the fragile structure contained in the devices to protect the fragile structure and otherwise hold it in place within the housing.

In low temperature catalytic converter applications, such as turbocharged direct injection (TDI) diesel powered vehicles, the exhaust temperature is typically about 150° C., and may never exceed 300° C. It has been observed in the field that catalytic converters, that are assembled with typical intumescent mats, fail with an unexpectedly high frequency.

One reason for these failures is that the exhaust temperature is too low to expand the intumescent, typically vermiculite, particles. This has even been found in converters that have been pre-heated to about 500° C. to pre-expand the intumescent particles. When subsequently used in the low temperature TDI application, the mats fail to provide sufficient pressure against the fragile structure and thus fail. It should be noted that converters used in gasoline engines overcome this initial loss in holding force as the converter continues to heat up to the final operating temperature, which may be as high as 900° C. At temperatures above 350° C., the intumescent particles expand and increase the holding force of the mat against the fragile structure.

A second reason for these failures is that organic binder systems used in the intumescent mat products degrade and cause a loss in the holding force. From room temperature to about 200° C. the loss in holding force is gradual; however, the loss in holding force is rapid from about 200° C. to about 250° C., as shown in FIG. 3.

FIG. 2 shows the performance of prior art intumescent mats in a 1000 cycle test at 300° C. with a gap between the fragile structure and the shell of about 4.0 to about 4.1 mm. All mats were preheated at 500° C. for one hour to pre-expand the intumescent material (vermiculite). In the 1000-cycle test, the mat must maintain a pressure of greater than 15 psi at all times to provide adequate holding force on the fragile structure. FIG. 2 shows a loss in holding force with the eventual failure after about 500 cycles. The data presented in this graph correlates well with the failures observed with converters mounted with conventional intumescent mounting mats used in TDI diesel applications operating at less than 300° C. The test procedure and specific results of the tests of prior intumescent mats are set forth in detail below.

Non-intumescent mat systems are known in the art. Fibers such as SAFFIL® (from ICI, United Kingdom) and MAFTEC® (from Mitsubishi Chemicals, Japan) may be used to mount fragile structures for use over a wide temperature range. These fiber only products contain no intumescent material, such as vermiculite, to increase the holding force as the converter is heated. These mats are composed of polycrystalline fibers with a high Young's Modulus (greater than $20$–$40 \times 10^6$ psi) which function as ceramic springs to provide the required holding force against the fragile structure. These products provide adequate function in turbocharged direct injection (TDI) diesel converters.

Historically, these products have been dry layed without the addition of organic binder; as a result, the thickness of these products is typically greater than 18 mm making them difficult to install in converters, as described in the patents referenced above. Further, the cost of these products has been prohibitively high as compared to intumescent mats. Recently, a new generation of these products have been provided with improved handling and installation by vacuum packing, or by the addition of organic binders and sometimes additional stitching or needling to achieve a thinner and more flexible mat. A thickness of less than 10 mm can be achieved by these means. However, testing of the new generation mats in the 150°–300° C. temperature range has shown lower holding force than for the first generation mats.

The first such product of this new generation is described in U.S. Pat. No. 5,580,532, which claims a flexible polycrystalline ceramic fiber mat for use in mounting catalytic converters, particularly useful in the operating temperature range of 750° C. to 1200° C. Flexibility is achieved by impregnating a mat with various organic binders. All of the binders referenced in this patent, however, yield a mat with lower performance in the 150°–300° C. operating temperature range of a TDI diesel converter. However, satisfactory performance may still be achieved due to the high Young's modulus of the fibers used in these mats.

European Patent Application EP803643 discloses a mat product made with mineral fibers over a very wide composition range (0–99 wt. % $Al_2O_3$, 1–99.8 wt. %$SiO_2$) bonded with a binder to produce a thin, flexible mat for mounting fragile structures. The fibers are further defined as preferably having compositions in the range of 95 wt. % $Al_2O_3$, or 75 wt. % $Al_2O_3$—25 wt. % $SiO_2$. The application states that only fibers with a high elastic modulus will provide sufficient holding force to support the fragile structure as the converter heats and cools during use. Fibers used in prior art intumescent mat products are stated not to be suitable. The application describes the use of conventional organic binders, such as acrylic latex, for applications where the temperature is high enough to burn-out the binder, such as above 500° C. For low temperature applications, such as with diesel engines in the 220°–300° C. range, the application states that conventional organic binders thermally degrade and become hard. Upon thermal cycling of the converter, the hardened mat is no longer capable of maintaining adequate holding force on the fragile structure and failure results. The application states that alternative binders which do not harden, such as a silicone binder, may successfully be used in this temperature range.

In U.S. Pat. No. 4,929,429 and 5,028,397, the comparative examples show that even when melt formed ceramic fibers have been treated to reduce the shot content to as low as 5%, these fibers still lack the requisite resiliency to adequately hold the fragile structure in the converter shell, as is described in U.S. Pat. No. 5,250,269. The U.S. Pat. No. 5,250,269 describes how adequate resiliency can be achieved by first heat treating melt formed ceramic fibers, such as CERAFIBER® (Thermal Ceramics, Augusta, Ga.). Comparative examples of mats made with melt formed ceramic fibers without treatment failed in both laboratory testing and converter hot shake testing.

What is needed in the industry is a mat that can function at an average mat temperature range from ambient temperature up to at least about 350° C. and can be installed in exhaust gas treatment devices such as TDI diesel catalytic converters and the like without a loss in holding force.

It is an object of the present invention to provide a mat that can function throughout an average mat temperature range from ambient temperature up to at least about 350° C. while maintaining a holding force of at least about 15 psi in exhaust gas treatment devices such as TDI diesel catalytic converters and the like.

It is another object of the present invention to provide a mat that is sufficiently thin and sufficiently flexible to be easily handled and installed in exhaust gas treatment devices such as TDI diesel catalytic converters and the like.

SUMMARY OF THE INVENTION

The present invention provides a non-intumescent mat for providing support for a fragile structure in a low temperature exhaust gas treatment device comprising high temperature resistant, amorphous, inorganic fibers, said fibers having a Young's Modulus of less than about $20 \times 10^6$ psi and a geometric mean diameter less than about 5 μm, said mat optionally including a binder, wherein the mat is adapted to provide a holding force of at least 15 psi throughout an average mat temperature range from ambient temperature up to at least about 350° C.

The present invention also provides an exhaust gas treatment device containing a fragile support structure within a housing, and a support element disposed between the fragile support structure and the housing, wherein said support element comprises a non-intumescent mat comprising high temperature resistant, amorphous, inorganic fibers, said fibers having a Young's Modulus of less than about $20 \times 10^6$ psi and a geometric mean diameter less than about 5 μm, said mat optionally including a binder, and wherein the mat is adapted to provide resistance to slippage of the support element in the housing at a force of at least about 60 times the acceleration of gravity throughout an average mat temperature range from ambient temperature up to at least 350° C.

DETAILED DESCRIPTION OF THE INVENTION

Figure 1:
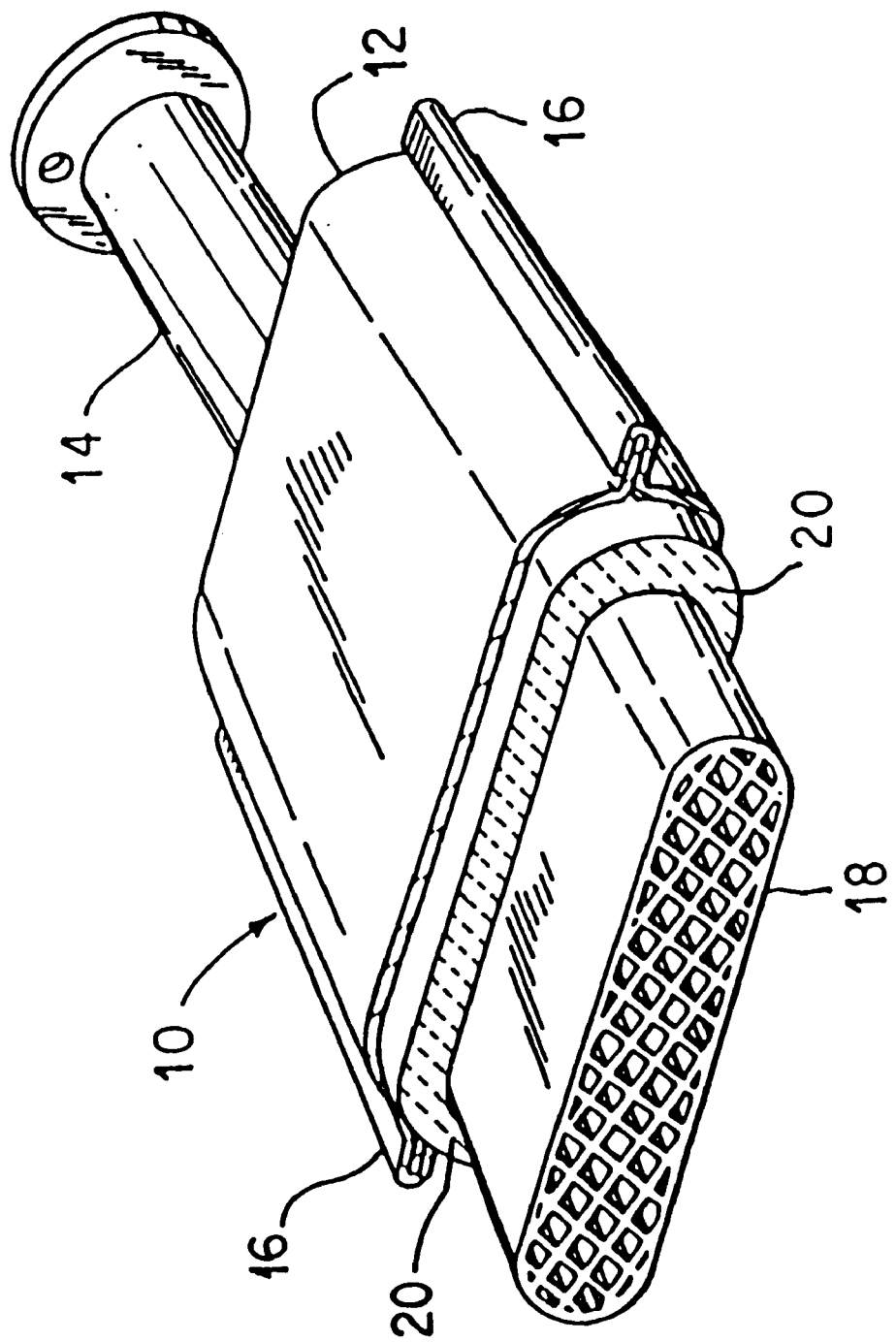
FIG. 1 is a fragmentary, elevational view of a catalytic converter according to the present invention.

The present invention provides a non-intumescent mat for providing a support structure in a low temperature exhaust gas treatment device. The mat comprises high temperature resistant, amorphous, inorganic fibers and optionally includes a binder.

The fiber of the present invention can also be a high temperature resistant fiber. By high temperature resistant, it is meant that the fiber can have a use temperature up to about 1260° C. The amorphous inorganic fibers of the present invention have a Young's Modulus of less than about $20 \times 10^6$ psi and a geometric mean diameter less than about 5 μm.

The fiber preferably comprises one of an amorphous alumina/silica fiber, an alumina/silica/magnesia fiber (such as S-2 Glass from Owens Corning, Toledo, Ohio), mineral wool, E-glass fiber, magnesia-silica fibers (such as ISOFRAX™ fibers from Unifrax Corporation, Niagara Falls, N.Y.), or calcia-magnesia-silica fibers (such as INSULFRAX™ fibers from Unifrax Corporation, Niagara Falls, N.Y. or SUPERWOOL™ fibers from Thermal Ceramics Company).

The alumina/silica fiber typically comprises from about 45% to about 60% $Al_2O_3$ and about 40% to about 55% $SiO_2$; preferably, the fiber comprises about 50% $Al_2O_3$ and about 50% $SiO_2$. The alumina/silica/magnesia glass fiber typically comprises from about 64% to about 66% $SiO_2$, from about 24% to about 25% $Al_2O_3$, and from about 9% to about 10% MgO. The E-glass fiber typically comprises from about 52% to about 56% $SiO_2$, from about 16% to about 25% CaO, from about 12% to about 16% $Al_2O_3$, from about 5% to about 10% $B_2O_3$, up to about 5% MgO, up to about 2% of sodium oxide and potassium oxide and trace amounts of iron oxide and fluorides, with a typical composition of 55% $SiO_2$, 15% $Al_2O_3$, 7% $B_2O_3$, 3% MgO, 19% CaO and traces of the above mentioned materials.

Magnesia-silica fibers typically comprise from about 69% to about 86% $SiO_2$, from about 14% to about 35% MgO, and from 0% to about 7% ZrO. More information on magnesia-silica fibers can be found in U.S. Pat. No. 5,874,375, which is hereby incorporated by reference. Calcia-magnesia-silica fibers typically comprise about 31% CaO, about 3% MgO, and about 65% $SiO_2$.

The mat provides a holding force of at least 15 psi throughout an average mat temperature range from ambient temperature up to at least about 350° C. The average mat temperature is the arithmetic average temperature across the entire mat. The holding force is provided across the temperature range of the mat as it is heated from ambient temperature up to at least about 350° C.

An amorphous fiber is defined as a fiber that is melt formed and has not been post processed by heat treating to either anneal or crystallize the fiber, so as to be substantially crystalline free, meaning that no crystallinity is detected by x-ray diffraction.

Optionally, the mat of the present invention includes a binder. Suitable binders include aqueous and non aqueous binders, but preferably the binder utilized is a reactive, thermally setting latex which after cure is a flexible material that is stable up to at least about 350° C. Preferably, about 5 to about 10 percent latex is employed, with about 8 percent being most preferred. Solution strength of the binder in the solvent (if used) can be determined by conventional methods based on the binder loading desired and the workability of the binder system (based on viscosity, solids content, and the like). Preferably, the binder is a silicone latex.

Production of fibers of the present invention is described in U.S. patent application Ser. No. 09/038,243 filed Mar. 11, 1998, which is herein incorporated by reference, except that in the present invention, the fibers are not heat treated to crystallize the fiber composition, and thus retain their amorphous structure. Briefly, the fibers are amorphous inorganic or glass fibers that are melt-formed. They are preferably fibers of high chemical purity (greater than about 98%) and preferably have an average diameter in the range of about 1 to about 10 $\mu$m, and most preferably in the range of about 2 to 4 $\mu$m. While not specifically required, the fibers may be beneficiated, as is well known in the art, to obtain a greater than 60 percent fiber index, meaning they contain less than 40 percent shot, and preferably less than about 30 percent shot.

Exhaust gas treatment devices include catalytic converters, diesel particulate traps, and the like. These devices contain similar elements. By way of example, a catalytic converter, as shown in FIG. 1, is described herein. Catalytic converter 10 includes a generally tubular housing 12 formed of two pieces of metal, e.g. high temperature-resistant steel. Housing 12 includes an inlet 14 at one end and an outlet (not shown) at its opposite end. The inlet 14 and outlet are suitably formed at their outer ends whereby they may be secured to conduits in the exhaust system of an internal combustion engine. Device 10 contains a fragile catalyst support structure, such as a frangible ceramic monolith 18 which is supported and restrained within housing 12 by a support element such as mat 20, the present invention. Monolith 18 includes a plurality of gas-pervious passages which extend axially from its inlet end surface at one end to its outlet end surface at its opposite end. Monolith 18 may be constructed of any suitable refractory metal or ceramic material in any known manner and configuration. Monoliths are typically oval or round in cross-sectional configuration, but other shapes are possible.

In accordance with the present invention, the monolith is spaced from its housing by a distance or a gap, which will vary according to the type and design of the device, e.g., a catalytic converter or a diesel particulate trap, utilized. This gap is filled by a support element (or mounting mat) 20 to provide resilient support to the ceramic monolith 18. The resilient support element 20 provides both thermal insulation to the external environment and mechanical support to the catalyst support structure, protecting the fragile structure from mechanical shock. The support element 20 also possesses good handleability and is easily processed in the fabrication of devices utilizing its capabilities of maintaining a substantially stable and uniform minimum holding pressure of at least 15 psi after undergoing 1000 mechanical cycles at a nominal temperature of about 350° C.

By the term "cycle" it is meant that the gap between the monolith (i.e., fragile structure) and housing is opened and closed over a specific distance and at a predetermined rate. In order to simulate realistic conditions, the expansion of the gap between a housing and a fragile structure of a given diameter is determined by calculating the coefficient of thermal expansion of the conventional housing at a maximum temperature of 350° C. Candidate support mats are characterized for their performance in this test versus installation density. A final mat basis weight is then selected which will provide a minimum holding force (Pmin) of greater than about 15 psi after 1000 cycles. The goal is to provide adequate support at the lowest cost, so the minimum basis weight that satisfies the greater than about 15 psi requirement is selected.

For alumina silica fiber mats of the present invention, this typically translates to a minimum basis weight of at least approximately 1200 g/m$^2$, and generally approximately 1600 g/m$^2$. Higher basis weight mats provide increased holding pressure and thus safety factors; however, at higher cost. Mats of the present invention typically have a green bulk density of at least about 0.20 g/cm$^3$, or greater and have an installed density from about 0.40 to about 0.75 g/cm$^3$. Mats of the present invention typically have a nominal thickness of from about 4.5 to about 13 mm. Nominal thickness is defined as the thickness when measured under a compressive force of 0.7 psi.

A gap of 3 to 4 mm between the fragile structure and shell is normally sufficient to provide adequate thermal insulation and to minimize the tolerance differences of the fragile structure and shell. The weight per unit area (basis weight) of the mat required to fill this gap is bounded on the lower end by the minimum compression force to provide adequate support of the fragile structure against the exhaust gas pressure and axial g-forces to which it is subjected during operation, and on the upper end by the breaking strength of the fragile structure. Basis weight ranges from about 1000 to about 3000 g/m$^2$. For a fragile structure having a 4.66 inch diameter mounted by a tourniquet mounting process, a 3 mm gap is adequate. The mat of the present invention having a nominal basis weight of about 1600 g/m$^2$ will result in an installed density of about 0.53 g/cm$^3$. For a 1600 g/m$^2$ mat, according to the present invention, the mat will have a thickness of approximately 7 mm, which facilitates easy handling and installation during converter assembly, compared to traditional non-intumescent mats.

Preferably, the mat of the present invention provides resistance to slippage of the support element in the housing at a force of at least about 60 times the acceleration of gravity. The resistance to slippage is provided throughout an average mat temperature range from ambient temperature up to at least about 350° C. The mat provides sufficient force between the housing and the support element to resist slippage of the support element within the housing, thus avoiding mechanical shock and breakage of the support structure.

The mounting mat or support element of the present invention can be prepared by any known techniques. For instance, using a paper making process, inorganic fibers are mixed with a binder to form a mixture or slurry. Any mixing means may be used, but preferably the fibrous components are mixed at about a 0.25% to 5% consistency or solids content (0.25–5 parts solids to 99.5–95 parts water). The slurry may then be diluted with water to enhance formation, and it may finally be flocculated with flocculating agent and drainage retention aid chemicals. Then, the flocculated mixture or slurry may be placed onto a paper making machine to be formed into a ply of inorganic paper. Alternatively, the plies may be formed by vacuum casting the slurry. In either case, they are typically dried in ovens. For a more detailed description of the standard paper making techniques employed, see U.S. Pat. No. 3,458,329, the disclosure of which is incorporated herein by reference. This method typically breaks the fibers during processing. Accordingly the length of the fibers are generally about 0.025 cm to about 2.54 cm when this method is used.

Furthermore, the inorganic fibers may be processed into a mat or ply by conventional means such as dry air laying. The ply at this stage, has very little structural integrity and is very thick relative to the conventional catalytic converter and diesel trap mounting mats. The resultant mat can be dry needled, as is commonly known in the art, to densify the mat and increase its strength.

Where the dry air laying technique is used, the mat may be alternatively processed by the addition of a binder to the mat by impregnation to form a discontinuous fiber composite. In this technique, the binder is added after formation of the mat, rather than forming the mat prepreg as noted hereinabove with respect the conventional paper making technique. This method of preparing the mat aids in maintaining fiber length by reducing breakage. Generally the length of the fibers are about 1 cm to about 10 cm, preferably about 1.25 cm to about 7.75 cm when this method is used.

If continuous filaments of alumina/silica/magnesia glass or E glass are used in the non-intumescent mat of the present invention, they can also be knitted or woven into a fabric.

Methods of impregnation of the mat with the binder include complete submersion of the mat in a liquid binder system, or alternatively spraying the mat. In a continuous procedure, a inorganic fiber mat which can be transported in roll form, is unwound and moved, such as on a conveyer or scrim, past spray nozzles which apply the binder to the mat. Alternatively, the mat can be gravity-fed past the spray nozzles. The mat/binder prepreg is then passed between press rolls which remove excess liquid and densify the prepreg to approximately its desired thickness.

The densified prepreg may then be passed through an oven to remove any remaining solvent and if necessary to partially cure the binder to form a composite. The drying and curing temperature is primarily dependent upon the binder and solvent (if any) used. The composite can then either be cut or rolled for storage or transportation.

The mounting mat can also be made in a batch mode, by immersing a section of the mat in a liquid binder, removing the prepreg and pressing to remove excess liquid, thereafter drying to form the composite and storing or cutting to size.

Regardless of which of the above-described techniques are employed, the composite can be cut, such as by die stamping, to form mounting mats of exact shapes and sizes with reproducible tolerances. This mounting mat 20 exhibits suitable handling properties, meaning it can be easily handled and is not so brittle as to crumble in one's hand like mat made with binder. It can be easily and flexibly fitted around the catalyst support structure 18 without cracking and fabricated into the catalytic converter housing 12 to form a resilient support for the catalyst support structure 18, with minimal or no flashing such as by extrusion or flow of excess material into the flange area 16 and provides a holding pressure against the catalyst support structure 18 of at least 15 psi at a normal temperature of 350° C. after 1000 cycles of gap expansion.

EXAMPLES

COMPARATIVE EXAMPLE 1

Figure 2:
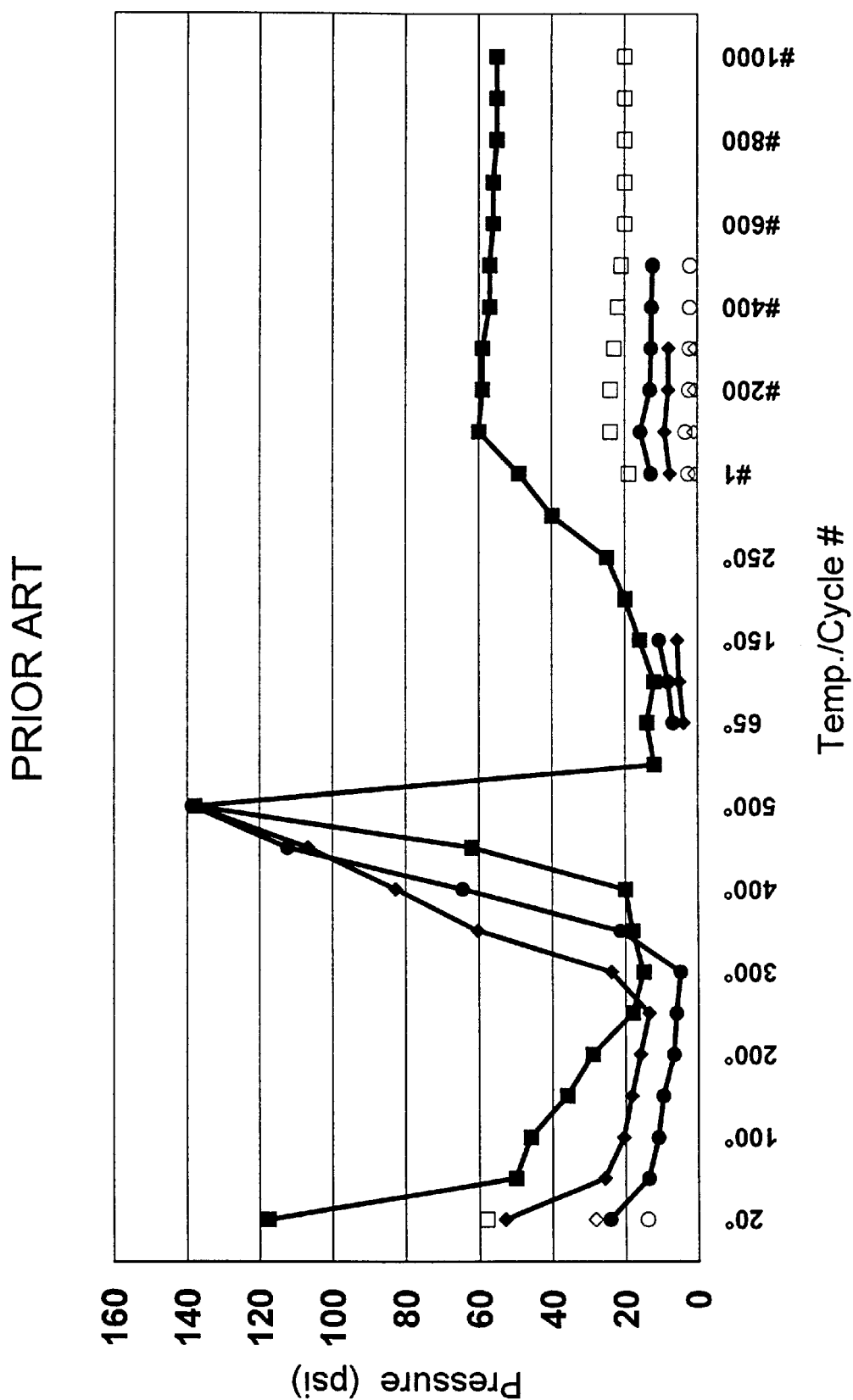
FIG. 2 is a graph showing the performance of intumescent mats preheated to 500° C. for one hour in a 1000 cycle test at 300° C. with a gap between the fragile structure and the shell of about 4.0 to about 4.1 mm.
Figure 3:
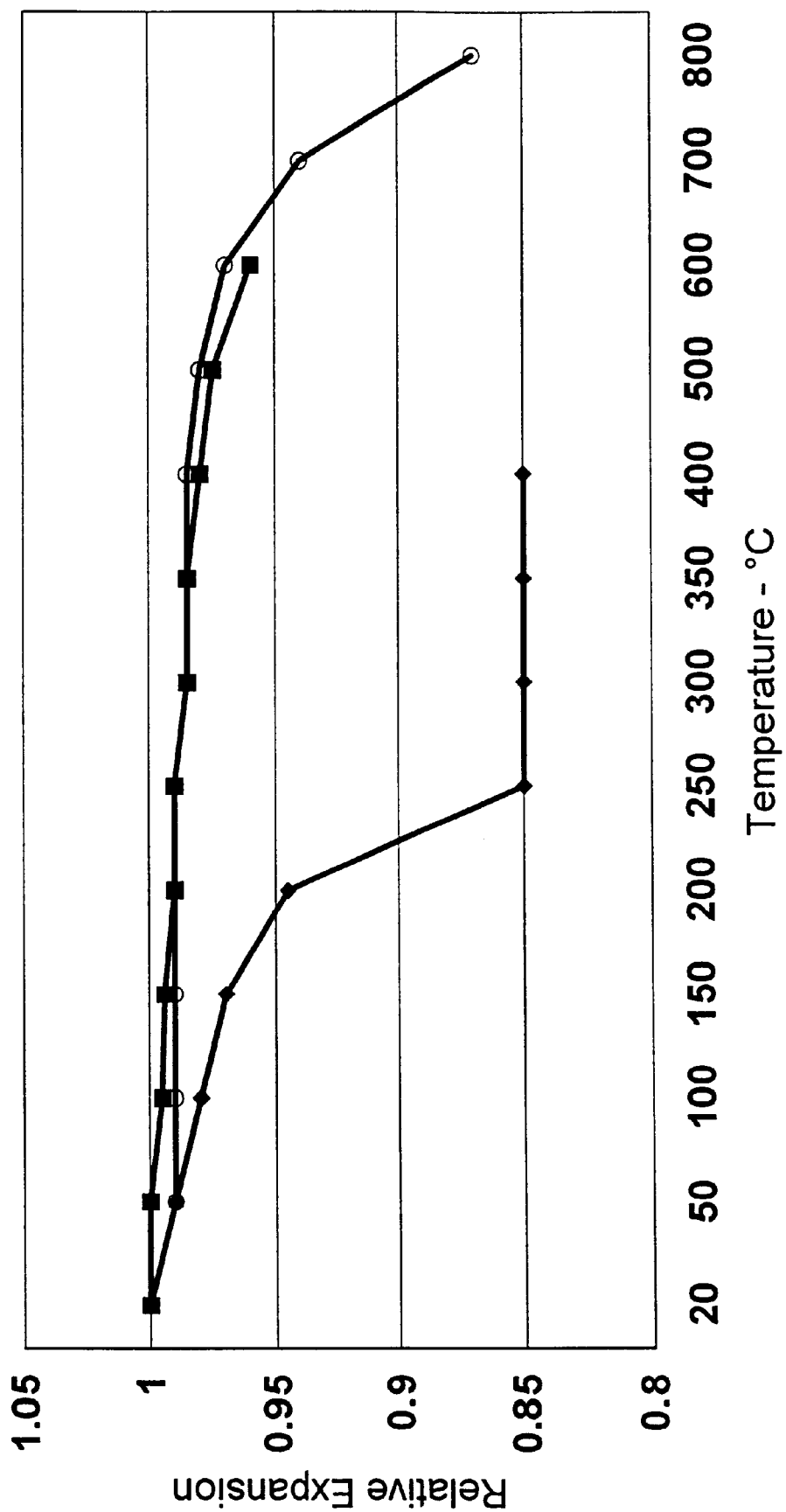
FIG. 3 is a graph of relative expansion of the non-intumescent fiber mats of the present invention at varying temperatures based on different binders for the fiber.

FIG. 2 shows the performance of prior art intumescent mats in a 1000 cycle test at 300° C. with a gap between the fragile structure and the shell of about 4.0 to about 4.1 mm. All mats were preheated at 500° C. for one hour to pre-expand the intumescent material (vermiculite). All mats had an initial installed density of approximately 1.0 g/cm$^3$. The mat shown by the circle, solid circle at Pmax and open circle at Pmin, is a typical intumescent mat containing approximately 55 wt. % vermiculite, 38 wt. % ceramic fiber, and 7 wt. % organic binder, and is a product called Type-100 that is manufactured by 3M under the trademark INTERAM®. The mat shown by the diamond, solid diamond at Pmax and open diamond at Pmin, is a product called Type-200, also manufactured by 3M under the trademark INTERAM®. Type-200 is similar to the Type-100, except that the temperature at which expansion of the vermiculite particles begins is claimed to be lower than for the Type-100 mat. The mat shown by the square, solid square at Pmax and open square at Pmin, is a product called AV2 manufactured by Unifrax Corporation under the trademark XPE®, and comprises approximately 45 wt. % vermiculite, 48 wt. % ceramic fiber, and 7% organic binder. The organic binder in all three products is similar.

In this test, the samples were compressed to a gap of 4.0 mm between quartz rams mounted in an Instron mechanical properties test machine. A furnace was then installed around the sample/ram assembly. While maintaining the 4.0 mm gap, the furnace was heated to the desired temperature, in this case 500° C., while monitoring the pressure response of the mat. Upon reaching 500° C., the furnace temperature was held constant for 1 hour to remove all of the organic binders and to allow the vermiculite particles to fully expand. After 1 hour, the furnace was cooled to room temperature, while the gap remained at the initial 4.0 mm gap. This preconditioned sample was then re-heated to the desired test temperature, in this case 300° C. Upon reaching 300° C., the furnace temperature was held constant and the gap cycled at a speed of approximately 2 mm/minute between 4.0 to 4.1 mm, simulating the expansion of the gap due to shell thermal expansion in a real converter during use. The pressure exerted by the mat was monitored as the gap opened and closed. Pmax is the pressure of the mat at 4.0 mm gap, while Pmin corresponds to the pressure of the mat at 4.1 mm. The test was concluded after 1000 cycles.

Mechanical analysis of typical catalytic converters has shown that the mat must maintain a minimum effective holding force of greater than 5 psi to prevent the fragile structure from slipping under maximum operating conditions. The coefficient of friction of typical mounting mats is approximately 0.33. Therefore, in the 1000-cycle test, the mat must maintain a pressure of greater than 15 psi at all times to provide adequate holding force on the fragile structure. FIG. 2 shows that the Type-100 and Type-200 mats failed to meet the Pmin>15 psi requirement even on the first cycle. Only the AV2 mat, square symbol, was able to maintain holding force above the minimum 15 psi. Even this mat had a holding force less than 15 psi after pre-heating, which could lead to a failure condition. Additional testing of the AV2 mat at 150° C. showed the measured Pmin to be less than 5 psi. The data presented in this graph correlates well with the failures observed with converters mounted with conventional intumescent mounting mats used in TDI diesel applications operating at less than 300° C.

EXAMPLE 2

Figure 4:
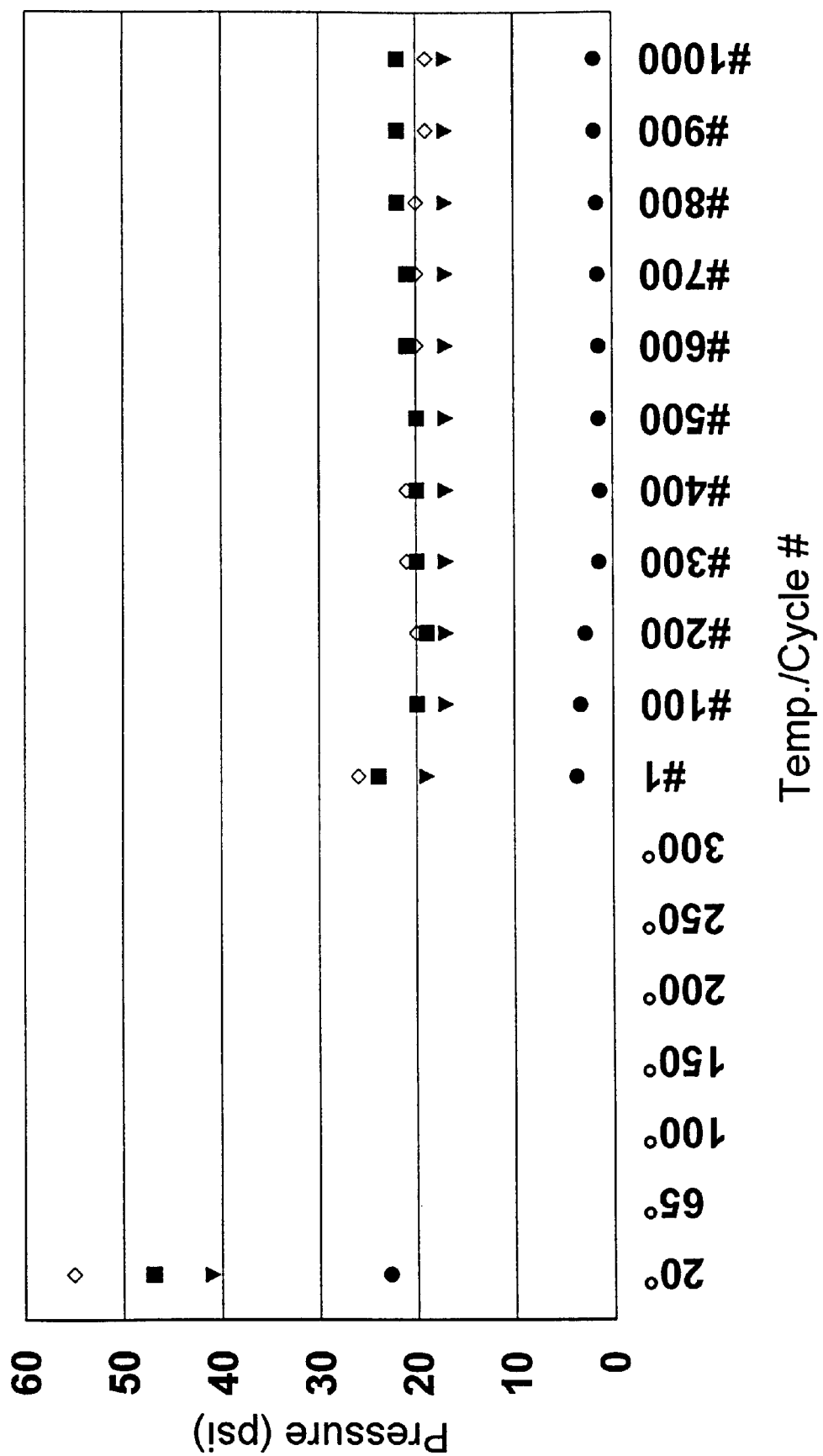
FIG. 4 is a graph showing performance of the non-intumescent fiber mats of the present invention with different binders as compared to a competitive dry layed, needle punched ceramic fiber blanket in a 1000 cycle test at 300° C., with a gap cycling of about 3.0 to about 3.1 mm.

Simulation of a TDI diesel converter was performed by cycle testing mats at 300° C. for 1000 cycles between a gap of about 3.0 to about 3.1 mm. The results are shown in FIG. 4. The samples were a 1550 g/m² of a competitive dry layed, needle punched ceramic (about 50% alumina/50% silica) fiber blanket, such as ULTRAFELT® manufactured by Thermal Ceramics, Augusta, Ga., (shown by an open diamond), and a 1600 g/m² mat of the present invention prepared with a 50% alumina/50% silica fiber with no binder (shown by a triangle); a silicone binder (shown by a solid square); and an acrylic binder that was not burned out prior to installation (shown by an solid circle).

The mat with the silicone binder comprised 92% of an amorphous fiber comprising 50% $Al_2O_3$ and about 50% $SiO_2$ with a fiber index of 72% and 8% of a silicone latex binder (DOW CORNING #85 silicone latex from Dow Corning, Inc. Midland, Mich.). The resulting mat had a basis weight of 1600 g/m² and was 7 mm thick. As shown in FIG. 4, the ULTRAFELT® and the silicone latex binder mats maintained a holding force greater than 15 psi.

The mat with the acrylic binder was similar to the mat with the silicone binder, with the 8% silicone binder being replaced with 8% HYCAR® 26083 acrylic latex, available from B.F. Goodrich, Brecksville, Ohio. Again, the sample had a basis weight of 1600 g/m² and was about 7 mm thick. The binder was not preburned, and thus failed on the first cycle. A second sample was prepared and was pre-burned prior to testing. This second mat performed comparably to the mat with the silicone binder.

EXAMPLE 3
Testing in a Catalytic Converter

A 4.66" diameter converter was assembled with comparative mats and tested in a hot shake test at 300° C. with an acceleration of 60 times gravity (60 g's). The converter with a traditional intumescent mat, consisting of approximately 55% unexpanded vermiculite, 37% ceramic fiber, and 8% acrylic latex binder, such as INTERAM® TYPE-100 and INTERAM® TYPE-200, lost its holding force and the fragile structure slipped within the shell in less than 50 hours.

A mat of the present invention, made with amorphous alumina/silica fiber and an acrylic latex binder which had been burned out prior to installation in the converter, was run in the hot shake test at 300° C. with an acceleration of 60 g and performed for 100 hours without failure. Upon inspection after testing, the fragile structure was found to be firmly mounted in the shell, with no relative axial movement. The mat was also found to be undamaged by gas erosion or other visible degradation.

A mat of the present invention, made with a silicone latex binder, was run in the hot shake test at 300° C. with an acceleration of 60 g and performed for 100 hours without failure.

As demonstrated above, the present invention achieves the objects of the invention. The present invention therefore provides a non-intumescent mat comprising an amorphous, inorganic fiber that functions up to about 350° C. without a loss in holding force in catalytic converters and the like.

It should be appreciated that the present invention is not limited to the specific embodiments described above, but includes variations, modifications and equivalent embodiments defined by the following claims.

What is claimed is:

1. A non-intumescent mat for providing support for a fragile structure in a low temperature exhaust gas treatment device comprising up to about 1260° C. temperature resistant, amorphous, inorganic fibers, said fibers having a Young's Modulus of less than about 20×10⁶ psi and a geometric mean diameter less than about 5 μm, said mat optionally including a binder, wherein the mat is adapted to provide a holding force of at least 15 psi throughout an average mat temperature range from ambient temperature up to at least about 350° C., wherein the temperature resistant, amorphous, inorganic fibers are melt formed and are not post processed by heat treating to either anneal or crystallize the fiber.

2. The mat of claim 1, wherein the temperature resistant, amorphous, inorganic fiber is at least one of an amorphous alumina/silica fiber, an alumina/silica/magnesia fiber, mineral wool, E-glass fiber, magnesia-silica fiber, and calcia-magnesia-silica fiber.

3. The mat of claim 2, wherein the alumina/silica fiber comprises the fiberization product of a melt having from about 45% to about 60% $Al_2O_3$ and about 40% to about 55% $SiO_2$.

4. The mat of claim 2, wherein the alumina/silica fiber comprises the fiberization product of a melt having about 50% $Al_2O_3$ and about 50% $SiO_2$.

5. The mat of claim 1, wherein the temperature resistant, amorphous, inorganic fiber is E glass.

6. The mat of claim 1, wherein the temperature resistant, amorphous, inorganic fiber is magnesia-silica fiber.

7. The mat of claim 1, wherein the temperature resistant, amorphous, inorganic fiber is calcia-magnesia-silica fiber.

8. The mat of claim 1, wherein the mat is substantially free of binder.

9. The mat of claim 1, wherein the binder is present and comprises a silicone latex.

10. The mat of claim 1, wherein the mat is formed with a binder comprising an acrylic latex which is burned out prior to operation.

11. The mat of claim 1, wherein the temperature resistant, amorphous, inorganic fiber contains less than about 40% shot.

12. The mat of claim 11, wherein the temperature resistant, amorphous, inorganic fiber contains less than about 30% shot.

13. The mat of claim 1, wherein the mat has a basis weight of from about 1000 to about 3000 g/m².

14. The mat of claim 1, wherein the mat has an installed density of from about 0.40 to about 0.75 g/cm³.

15. The mat of claim 1, wherein the mat has a nominal thickness of from about 4.5 to about 13 mm.

16. The mat of claim 1, wherein the mat is one of a needle punched inorganic fiber blanket, a knitted glass fabric, and a woven glass fabric.

17. An exhaust gas treatment device comprising:
   a. a housing having an inlet at one end and an outlet at its opposite end through which exhaust gases flow;
   b. a structure resiliently mounted within said housing, said structure having an outer surface and an inlet end surface at one end in communication with said inlet of said housing and an outlet end surface at its opposite end in communication with said outlet of said housing; and c. a support element disposed between said structure and said housing, wherein said support element comprises the mat of claim 1.

18. The exhaust gas treatment device according to claim 17, wherein the device is a catalytic converter for use with a turbocharged direct injection diesel engine.

19. The exhaust gas treatment device according to claim 17, wherein the mat is one of a needle punched inorganic fiber blanket, a knitted glass fabric, and a woven glass fabric.

20. The exhaust gas treatment device according to claim 17, wherein the mat contains a binder, which is a silicone latex.

21. An exhaust gas treatment device comprising a fragile support structure within a housing, and a support element disposed between the fragile support structure and the housing, wherein said support element comprises a non-intumescent mat comprising up to about 1260° C. temperature resistant, amorphous, inorganic fibers, said fibers having a Young's Modulus of less than about $20 \times 10^6$ psi and a geometric mean diameter less than about 5 µm, and said mat optionally including a binder, and wherein the mat is adapted to provide resistance to slippage of the support element in the housing at a force of at least about 60 times the acceleration of gravity throughout an average mat temperature range from ambient temperature up to at least about 350° C., wherein the temperature resistant, amorphous, inorganic fibers are melt formed and are not post processed by heat treating to either anneal or crystallize the fiber.

22. The exhaust gas treatment device of claim 21, wherein the temperature resistant, amorphous, inorganic fiber is at least one of an amorphous alumina/silica fiber, an alumina/silica/magnesia fiber, mineral wool, E-glass fiber, magnesia-silica fiber, and calcia-magnesia-silica fiber.

23. The exhaust gas treatment device of claim 22, wherein the alumina/silica fiber comprises the fiberization product of a melt having from about 45% to about 60% $Al_2O_3$ and about 40% to about 55% $SiO_2$.

24. The exhaust gas treatment device of claim 22, wherein the alumina/silica fiber comprises the fiberization product of a melt having about 50% $Al_2O_3$ and about 50% $SiO_2$.

25. The exhaust gas treatment device of claim 21, wherein the temperature resistant, amorphous, inorganic fiber is E glass.

26. The exhaust gas treatment device of claim 21, wherein the temperature resistant, amorphous, inorganic fiber is magnesia-silica fiber.

27. The exhaust gas treatment device of claim 21, wherein the temperature resistant, amorphous, inorganic fiber is calcia-magnesia-silica fiber.

28. The exhaust gas treatment device of claim 21, wherein the mat is substantially free of binder.

29. The exhaust gas treatment device of claim 21, wherein the binder is present and comprises a silicone latex.

30. The exhaust gas treatment device of claim 21, wherein the mat is formed with a binder comprising an acrylic latex which is burned out prior to operation.

31. The exhaust gas treatment device of claim 21, wherein the temperature resistant, amorphous, inorganic fiber contains less than about 40% shot.

32. The exhaust gas treatment device of claim 31, wherein the temperature resistant, amorphous, inorganic fiber contains less than about 30% shot.

33. The exhaust gas treatment device of claim 21, wherein the mat has a basis weight of from about 1000 to about 3000 g/m².

34. The exhaust gas treatment device of claim 21, wherein the mat has an installed density of from about 0.40 to about 0.75 g/cm³.

35. The exhaust gas treatment device of claim 21, wherein the mat has a nominal thickness of from about 4.5 to about 13 mm.

36. The exhaust gas treatment device of claim 21, wherein the mat is one of a needle punched inorganic fiber blanket, a knitted glass fabric, and a woven glass fabric.

* * * * *